United States Patent [19]
Millsapps, Jr.

[11] Patent Number: 5,452,770
[45] Date of Patent: Sep. 26, 1995

[54] ROCK BIT AND IMPROVED FORGING METHOD FOR MANUFACTURING THEREOF

[75] Inventor: Stuart C. Millsapps, Jr., Austin, Tex.

[73] Assignee: Briscoe Tool Company, Houston, Tex.

[21] Appl. No.: 297,965

[22] Filed: Aug. 30, 1994

[51] Int. Cl.$^6$ ................................... E21B 10/08
[52] U.S. Cl. ................. 175/336; 175/339; 76/108.4; 29/DIG. 18
[58] Field of Search .................... 175/331, 336, 175/338, 339, 415, 424, 432; 76/108.2, 108.9; 29/DIG. 18

[56] References Cited

U.S. PATENT DOCUMENTS

| | | | |
|---|---|---|---|
| 4,187,743 | 2/1980 | Thomas | 76/108 |
| 4,570,725 | 2/1986 | Matthias et al. | 175/432 |
| 4,605,157 | 8/1986 | Barr et al. | 228/132 |
| 4,694,551 | 9/1987 | Mathews | 29/402.08 |
| 4,711,143 | 12/1987 | Loukanis et al. | 175/375 X |
| 4,711,144 | 12/1987 | Barr et al. | 175/432 X |

Primary Examiner—Roger J. Schoeppel
Attorney, Agent, or Firm—Browning, Bushman, Anderson & Brookhart

[57] ABSTRACT

A method of manufacturing a roller cone type drill bit, or main body thereof, includes forging a monolithic main body forging comprising a shank blank extending longitudinally at one end and a plurality of circumferentially spaced leg stubs at the other end; turning the shank blank to form a threaded section; rotatably mounting a respective roller cone on each of a plurality of journal members, each journal member being carried at one end of a respective leg extension; and welding a respective one of the leg extensions to each of the leg stubs. The main body is forged with its longitudinal centerline perpendicular to its flash line, the latter being located well inward of the leg end of the forging. The radially outer surface of each leg stub is forged to taper radially inwardly from the flash line to the outer end of the leg stub, and subsequently machined to remove the taper, resulting in a radially outer surface of each leg stub circumferentially wider in the vicinity of the former flash line than at its outer end.

25 Claims, 3 Drawing Sheets

ROCK BIT AND IMPROVED FORGING METHOD FOR MANUFACTURING THEREOF

BACKGROUND OF THE INVENTION

The present invention pertains to roller cone type drill bits or "rock bits," e.g. as are used for drilling oil and gas wells. More specifically, such bits have a plurality of cones, usually three, rotatably mounted on respective legs of a bit body. As the bit body is rotated along with the drill string, the cones roll along the bottom of the hole, generally breaking up the rock by a crushing action (by way of contrast, for example, to drag type bits, which typically have no relatively moving parts and break up the rock by a scraping action).

Traditionally, the bit body of such a roller cone type drill bit is formed by welding together three elongate sector-like pieces along longitudinally extending juncture lines, each of the pieces including one leg of the bit and a one-third sector of the remainder of the bit body. An example may be seen in prior U.S. Pat. No. 4,187,743. Each of the three pieces is formed by forging, with the parting line of the forging dies, and thus the flash line of the forging, running generally parallel to the length of the work piece, and of the bit body to be formed therefrom.

It has also been known to form bit bodies by welding leg portions onto a main body portion along generally transverse or horizontal lines. An example is given in U.S. Pat. No. 4,694,551.

In U.S. Pat. No. 4,711,143, there is shown an improvement over such horizontal welding methods wherein the surfaces of the main body to which the leg portions will be welded are disposed at a non-perpendicular angle to the centerline, more specifically located on a common conical locus, and the surfaces of the leg portions to be welded thereto are correspondingly formed to mate with the main body along that locus. Although U.S. Pat. No. 4,711,143, allows for the invention thereof to be applied to main bodies of new manufacture, that invention was originally developed in connection with an operation of salvaging parts of used bits and forming new bits from them. In practice, the main body was one of the salvaged or premanufactured parts. Thus, aside from the machining of this main body to provide the aforementioned conical surface, and other operations necessary to adapt it to the method of said prior patent, no detail is given as to the method of original manufacture of the main body portion of the bit. Indeed, as practiced by assignee and its predecessor(s) in interest, the main body was a salvaged part made of three sector-like pieces, as described above.

U.S. Pat. No. 4,694,551, states, in theory, that entire main bodies (for welding to leg extensions) could be cast or forged. However, this patent neither recognizes nor addresses the practical problems of forging a main body in one piece. To applicant's knowledge, no such bodies were forged prior to the present invention. Assignee made one such bit body by casting, as an experiment in approximately 1990. A salvaged three-sector body was used to make the mold for this casting.

SUMMARY OF THE INVENTION

In accord with the present invention, a technique has been developed for forming such main bodies by forging, and relatively little subsequent machining. This results in a number of advantages. A forged body is generally stronger than a cast body. Also, the present invention includes a way of forging the main body so as to complement the original, generally longitudinal grain flow of the metal and causing the ultimate grain flow pattern to conform to the outside shape of the bit body. This is done by orienting the main body forging vertically in the dies, so that the parting line of the dies, and thus the flash line of the resulting main body forging, run generally perpendicular to the centerline of the main body. This orientation also prevents laps, which sometimes occur in conventional sector forgings.

A number of the features of the invention which help to make this forging process possible, or enhance the result, involve configurational changes in the main body forging and/or the subsequently machined finished main body, by way of comparison to conventional bit bodies.

First, it must be borne in mind that it is desirable to form the opposed forging dies such that approximately half the metal formed therein is in the upper die and half in the lower die. For a drill bit body of the type in question, this puts the parting line of the dies, and thus the flash line of the forging, well inward of the leg end, i.e. inward from the leg end by at least about ¼ to about ⅜ of the full length of the main body forging. To allow the leg stub portion of the forging to be removed from the corresponding die, the radially outer surface of each leg stub should taper in a reverse direction to that in conventional such bit bodies. A draft angle of at least about 3° to 5° will ordinarily be required, depending on whether a press die or a hammer die is used. Specifically, the surfaces taper radially inwardly from the flash line to the outer end of the leg stub. This area is subsequently machined to remove the taper and/or impart a reversed, conventional taper, so that the radial width of the finished main body member in the vicinity of the former flash line of the main body forging is less than or equal to its width at the outer end of the leg stubs. This in turn results in the outer side of each leg stub being circumferentially wider in the vicinity of the former flash line than at its outer end, and is actually the reverse of conventions used in bit bodies made of three sectors, another distinction over conventional bits.

In preferred embodiments, the main body forging also includes a plurality of nozzle mounting portions or bosses interspersed circumferentially between the leg stubs. Thus, these portions likewise have their radially outer sides tapered radially inwardly from the flash line to their outer ends. However, in preferred embodiments, the radially outer sides of the nozzle mounting portions of the forging at no point extend radially beyond the outer ends of the leg stubs. Thus, when the aforementioned machining of the leg stubs is done to remove the taper of the forging on the outer sides of the leg stubs, the outer ends of the leg stubs will still represent the widest part of the bit body, and no further machining of the nozzle mounting portions will be necessary in order to prevent them from unwanted contact with the borehole in use.

Because of some of the requirements of the prior art manner of horizontally forging a one-third sector of the bit body, it has previously been impossible to provide such forged nozzle mounting portions each located midway between the two closest leg stubs. However, in the improved longitudinal forging method of the present invention, the nozzle mounting portions can be located anywhere between the leg stubs as desired, including locating each such mounting portion midway between the two closest leg stubs.

The shank blank of the main body forging is likewise tapered radially inwardly from a base area to its free end at a first or draft angle with respect to the centerline of the forging, which angle is adequate to allow the forging to be removed from the respective die half. This first angle may be greater than the desired taper of the finished threaded section, so that the aforementioned turning operation may be done so as to taper the threaded section at a second angle less than the first angle.

Preferably, the turning of the shank blank to form the threaded section is the first machine work done on the forging. Then, the resulting threaded section can be threaded to an appropriate holding member which holds the forging while all other machining operations are performed. Thus, all of the remaining machining will be precisely related to the centerline of the threaded section.

In addition to the aforementioned machining of the radially outer sides of the leg stubs, such additional machining may comprise machining the ends of the leg stubs to lie along a common conical locus, generally as recommended in U.S. Pat. No. 4,711,143.

Such additional machining may also include machining respective recesses for pressure compensators in the inner parts of the leg stubs, and communication channels from the recesses through the outer ends of the leg stubs.

Furthermore, whereas in prior art horizontal sector forging methods, the nozzle recesses and mud flow passages were forged, in the present invention, nozzle mounting recesses may be machined into the nozzle mounting portions of the main body forging, as will a circulation bore through the end of the shank, and a respective communication bore between each nozzle mounting recess and the central circulation bore. In order to allow for optimum orientation of the nozzle mounting recesses, and thus of the nozzles to be mounted therein, these recesses may be machined at a first angle with respect to the centerline of the main body, and the respective communication bores at a second angle, greater than the first angle, depending on the size of the bit.

In addition to a method of forming or manufacturing a main body and/or a complete bit, the present invention encompasses a bit formed in accord with such method, and therefore comprising the configurational differences mentioned above.

The above and other features and advantages of the present invention will be made further apparent by the drawings, the following detailed description, and the claims.

DETAILED DESCRIPTION

Figure 2:
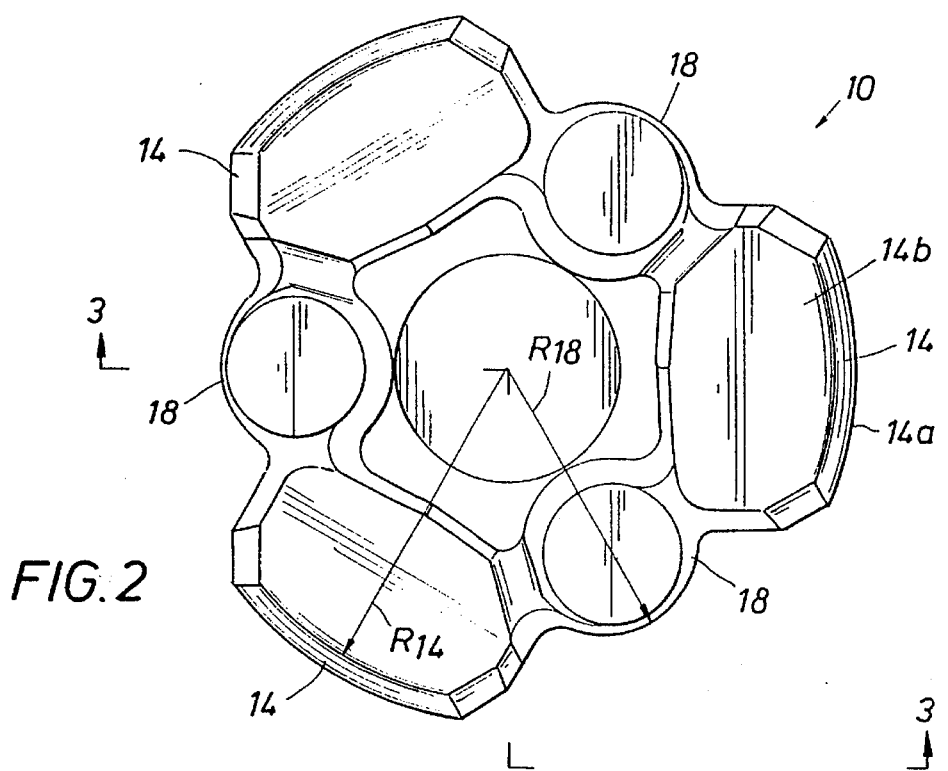
FIG. 2 is a plan view, taken along the line 2—2 in FIG. 3, of the leg end of the forging.
Figure 3:
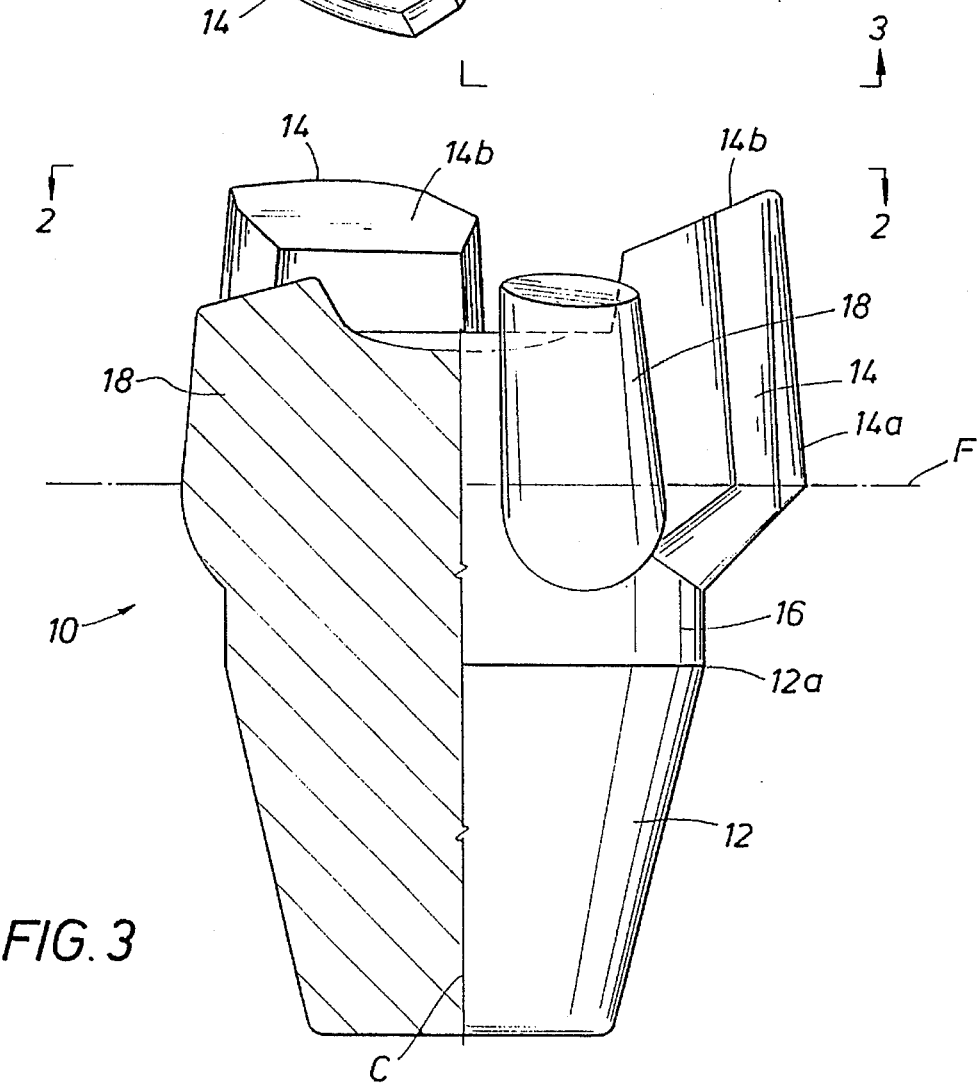
FIG. 3 is a longitudinal quarter-sectional view of the forging taken along the line 3—3 in FIG. 2.

FIGS. 2 and 3 show a forging, in accord with the present invention, for the main body portion of a roller cone type drill bit. It is to be noted that the forging is monolithic, i.e. forged from a single body of heated metal, and that it defines the full circumferential extent of the body portion in question, as opposed to just a sector. The forging has a longitudinal centerline C. But for any slight misalignment which may occur in the subsequent turning of the shank blank 12, as described hereinbelow, C will also represent the centerline of the finished main body portion of the bit. As used herein, terms such as "longitudinal," "radial" and "circumferential" will be with reference to the centerline C, unless otherwise noted. As shown, the shank blank 12 is frusto-conical, and extends longitudinally at one end of the forging 10. At the other end of the forging 10 are three leg stubs 14 extending generally longitudinally, but spaced radially outwardly from the centerline C, as well as spaced circumferentially from one another. Intermediate the leg stubs 14 and the shank blank 12 is a joining portion 16, which is slightly conical to provide a draft angle allowing removal from the forge die.

The line F indicates the location of the flash line of the forging 10, which is, as will be appreciated, coincident with the parting line of the dies which forge the member 10. Thus, by way of contrast to conventional sector forging techniques, the complete monolithic main body forging 10 is forged in a longitudinally upright ("vertical") position, as indicated by the fact that the flash line F runs perpendicular to the longitudinal centerline C. This causes the internal fibers or "grain flow" of the metal to retain its preferred generally longitudinal orientation.

After forging, the flash (not shown) is punch trimmed from the resulting main body forging in this vertically upright position.

The forging 10 also includes three nozzle mounting portions or bosses 18 circumferentially interspersed between the leg stubs 14.

The flash line F is located such that approximately half of the metal being forged is located in each of the two opposed dies which shape the forging 10. As can be seen in FIG. 3, this places the flash line F well inward from the outer extremity of the leg stub end of the forging, i.e. at least about ¼ to about ⅜ of the way along the length of the forging 10 as a whole. This places the line F nearly at the inner extremity of the leg stubs 14. Thus, in order to allow the upper (as shown) part of the forging 10 to be removed from the die which forms it, the radially outer surfaces, e.g. 14a of the leg stubs of the forging, are forged in a configuration to taper radially inwardly from the flash line F to their outer or free ends 14b. This is a reverse direction to the taper in conventional bits. It should ordinarily provide a draft angle of at least about 3° to 5°, depending on whether press dies or hammer dies are used. Likewise, the radially outer surfaces of the nozzle mounting bosses 18 are similarly tapered. However, as can be seen by comparing the radii $R_{18}$ and $R_{14}$ in FIG. 2, at no point do the outer surfaces of bosses 18 extend radially beyond the outer ends of the leg stubs 14. Thus, when the radially outer surfaces 14a are subsequently machined to remove the taper, as indicated at 14c in FIG. 1, the circle defined by the outer ends of surfaces 14c will represent the widest part of the bit body, and no machining of the bosses 18 will be necessary in order to keep them from undesirably forcible contact with the borehole while drilling. As shown, the machining is done so as to remove the taper 14a leaving a surface 14c which lies on a straight-sided cylinder or preferably a reverse taper, i.e. wherein the inner part of the leg stub would lie on a smaller radius than the outer end of the leg stub, as in a conventional bit.

Figure 1:
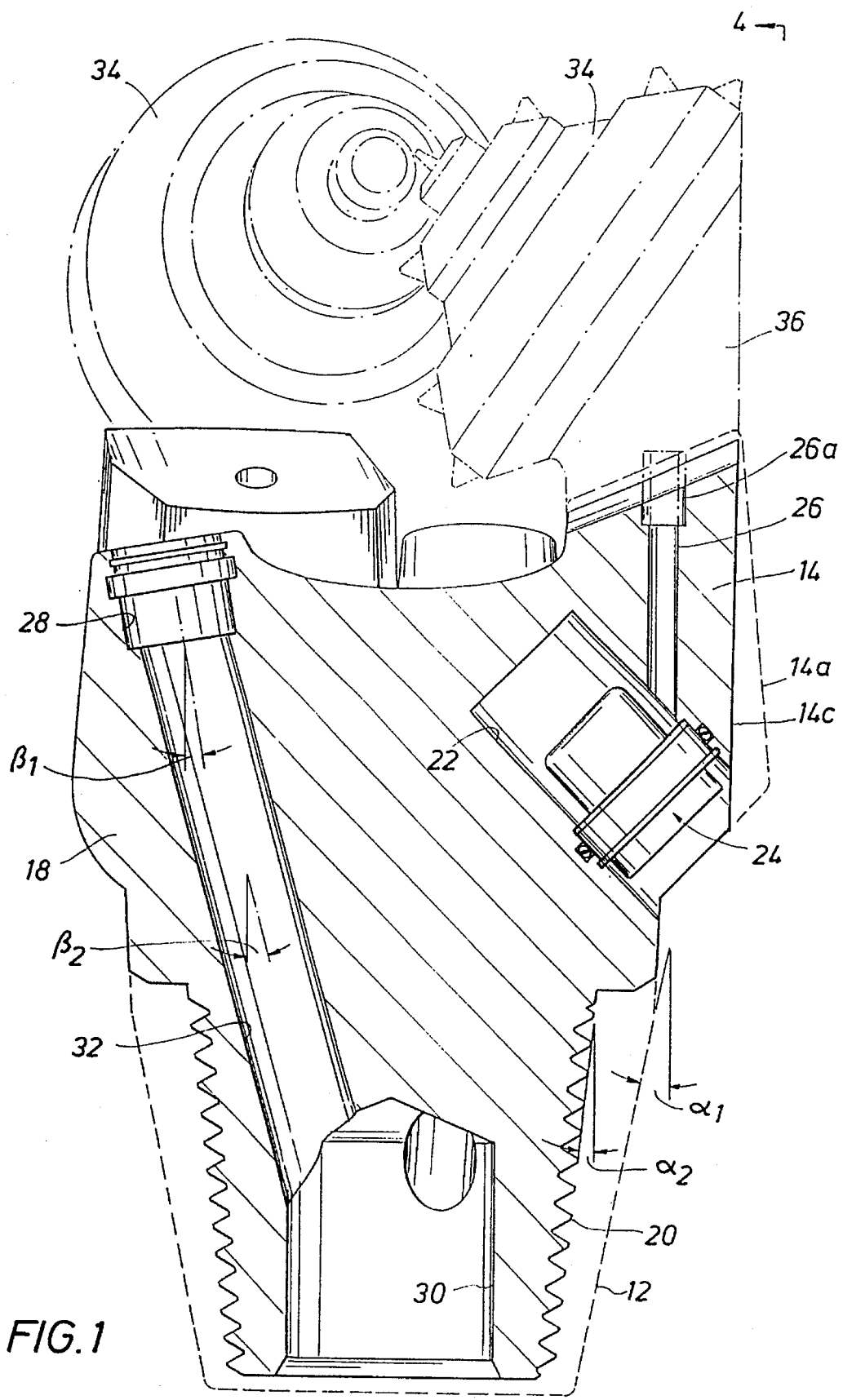
FIG. 1 is a view of a bit body according to the present invention in storage (as opposed to drilling) orientation, with the main body in longitudinal cross-section, with parts of the original forging which are machined away shown in uniform dashed line, and certain parts of the bit which are unrelated to the unique aspects of the present invention being shown in dot-dash phantom.

The shank blank 12 is likewise tapered radially inwardly from its inner or base area 12a to its outer or free end in order to permit its removal from the corresponding forging die. As best shown in FIG. 1, the angle $\alpha_1$ of the shank blank 12 with respect to vertical (and thus to the centerline C) may be greater than that which is desired for the tapered threaded connection 20 to be formed from the blank 12 by turning. The taper of threaded section 20 must be standardized to mate with a box in a drill collar or a piece of drill pipe. Thus, the subsequent machining step of turning the shank blank 12 to form threaded section 20 may be done so as to taper section 20 to a different angle $\alpha_2$ which is less than $\alpha_1$.

The last mentioned machining operation, i.e. turning of threaded section 20, is preferably performed first, after the forging 10 has been removed from the forging dies. Then, the main body member can be threaded via section 20 to an appropriate holding member, and subsequent machining operations performed while it is on that holding member. This helps to ensure that the subsequently machined areas are properly referenced or indexed to the centerline of threaded section 20.

Figure 4:
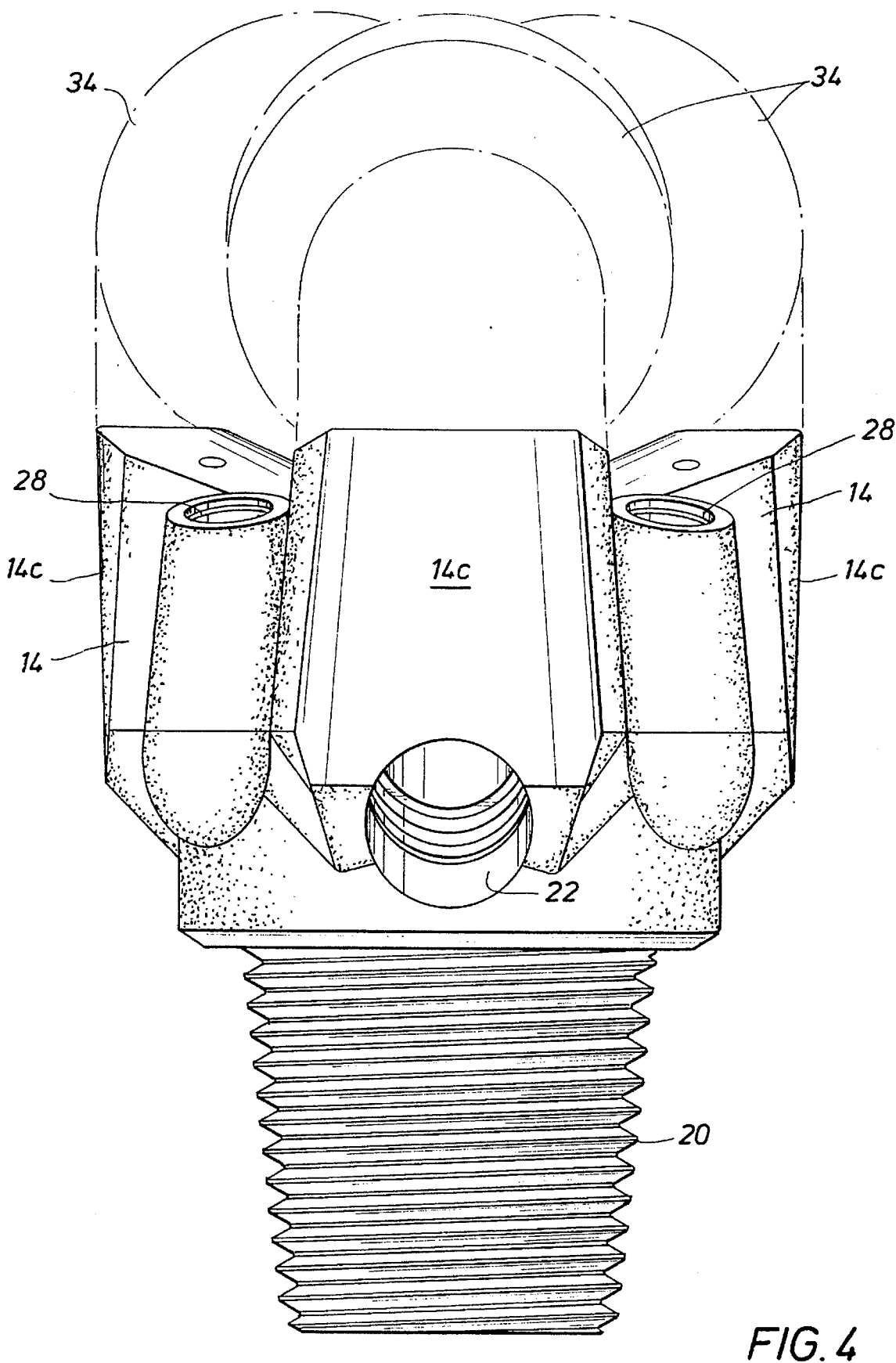
FIG. 4 is a side elevation of the finished bit body taken along the line 4—4 in FIG. 1.

In addition to the removal of taper 14a, referred to above, which, as shown in FIG. 4, results in a radially outer leg stub surface 14c which is, uncharacteristically, circumferentially wider adjacent the former flash line than at its outer end, these other machining operations may include the following:

machining of the end surfaces 14b of the leg stubs to taper radially and longitudinally inwardly, preferably at an angle of 22.5° to horizontal, e.g. so as to lie on a common conical locus, as described in prior U.S. Pat. No. 4,711,143;

machining of recesses 22 in leg stubs 14 for receipt of lubricant pressure compensators 24; (compensator 24 is not described in detail as it does not, per se, form part of the invention, and may be of any suitable type known in the art);

machining of communication channels 26 extending from the recesses 22 through the outer ends of the leg stubs 14;

channels 26 may be counterbored, as indicated at 26a, for purposes described more fully in prior U.S. Pat. No. 4,711,143;

machining of a respective nozzle mounting recess 28 in each of the bosses 18, a (preferably central) circulation bore 30 through the end of threaded section 20, and a respective communication bore 32 interconnecting each recess 28 with the bore 30; depending on the size bit, in order to provide the optimum orientation of recess 28, and the nozzle to be received therein, the recess 28 may have its centerline disposed at a first angle $\beta_1$ with respect to vertical, and thus to the centerline C, while the centerline of bore 32 is machined at a second angle $\beta_2$, with respect to vertical, and greater than $\beta_1$.

It will be appreciated that the machining of the recesses 28 and 22 may include the machining of communicating grooves for O-rings, retaining rings, etc., as well known in the art.

After the machining processes, three conventional roller cones 34 with suitable cutting teeth are rotatably mounted on respective sealed journal members, each of which extends at a suitable offset angle from a respective leg extension 36 (see prior U.S. Pat. No. 4,711,143.) The end surfaces of leg extensions 36 are shaped to mate with the conical surfaces of leg stubs 14, and are welded thereto, preferably by electron beam welding. Then, the bearings of the cutters and their lubrication system are greased, and the compensators 24 are mounted in recesses 22. Nozzles and associated parts known in the art are installed in recesses 28, and may be of any type well known in the art.

Numerous modifications of the exemplary embodiments described above will suggest themselves to those of skill in the art. Accordingly, it is intended that the scope of the present invention be limited only by the claims which follow.

What is claimed is:

1. A method of manufacturing a roller cone type drill bit comprising the steps of:

vertically forging a monolithic main body forging comprising a shank blank extending longitudinally at one end and a plurality of circumferentially spaced leg stubs at the other end, with its longitudinal centerline perpendicular to its flash line;

turning the shank blank to form a threaded section;

rotatably mounting a respective roller cone on each of a plurality of journal members, each journal member being carried at one end of a respective leg extension;

and welding a respective one of the leg extensions to each of the leg stubs.

2. The method of claim 1 comprising locating the flash line well inward of the free ends of the leg stubs of the main body forging.

3. The method of claim 1 comprising forging the radially outer surface of each leg stub of the main body forging to taper radially inwardly from the flash line to the outer end of the leg stub.

4. The method of claim 3 further comprising machining the outer side of each leg stub of the main body forging to remove said taper, so that the radial width of the finished main body member in the vicinity of the former flash line of the main body forging is less than or equal to its width at the outer ends of the leg stubs.

5. The method of claim 4 comprising so machining the outer side of each leg stub so that it is circumferentially wider in the vicinity of the former flash line than at its outer end.

6. The method of claim 4 comprising so forging the main body forging to include a plurality of nozzle mounting portions interspersed between the leg stubs so that the radially outer side of each nozzle mounting portion is tapered radially inwardly from the flash line to an outer end thereof, but at no point extends radially beyond the outer ends of the leg stubs.

7. The method of claim 6 wherein each nozzle mounting portion is formed approximately mid way between the two closest leg stubs.

8. The method of claim 3 wherein, after forging but before machining, flash is punch trimmed from the main body forging with the main body forging in vertical longitudinal position.

9. The method of claim 1 comprising so forging the shank blank so that it is tapered radially inwardly from a base area to its free end at a first angle with respect to the centerline; and so turning the shank blank so that the resulting threaded section is so tapered at a second angle less than said first angle.

10. The method of claim 1 further comprising, after machining the shank blank, threadedly connecting the resulting threaded section to a holding member and performing other machining operations with the main body forging on the holding member, whereby all such other machining is done with respect to the centerline of the threaded section.

11. The method of claim 10 wherein such other machining includes machining a radially wider inner part of each leg stub to a radial width less than or equal to that at the outer end of the leg stub.

12. The method of claim 11 wherein such other machining includes machining the ends of the leg stubs to taper radially and longitudinally inwardly.

13. The method of claim 12 including so machining the ends of the leg stubs to lie along a common conical locus.

14. The method of claim 12 wherein such other machining includes machining respective recesses for pressure compensators in the inner parts of the leg stubs, and communication channels from the recesses through the outer ends of the leg stubs.

15. The method of claim 12 wherein, in nozzle mounting portions so forged in interspersed relation to the leg stubs, such further machining includes the machining of nozzle mounting recesses; such other machining further comprising forming a circulation bore through the end of the shank, and a respective communication bore between each nozzle mounting recess and the central circulation bore.

16. The method of claim 15 comprising so forming the nozzle mounting recess at a first angle with respect to the centerline of the main body, and so forming the communication bore at a second angle with respect to the centerline of the main body, the second angle being greater than the first angle.

17. A roller cone type drill bit comprising:

a forged monolithic main body having generally longitudinal grain flow and including a threaded section at one end and a plurality of circumferentially spaced leg stubs at the other end;

a respective leg extension welded to each of the leg stubs, each leg extension having a journal member extending angularly from its outer end, and a roller cone rotatably mounted on the journal member.

18. The apparatus of claim 17 wherein each leg stub has its radially outer surface machined, and is circumferentially wider at its inner end than at its outer end.

19. The apparatus of claim 17 wherein the main body further comprises a plurality of nozzle mounting portions interspersed between the leg stubs, the radially outer side of each nozzle mounting portion begin tapered radially inwardly from a longitudinally inner portion to a longitudinally outer portion thereof, but at no point extending radially beyond the leg stubs.

20. The apparatus of claim 19 wherein each nozzle mounting portion is formed approximately mid way between the two closest leg stubs.

21. The apparatus of claim 19 wherein each nozzle mounting portion has a nozzle mounting recess machined therein at a first angle with respect to the centerline of the main body;

wherein the threaded connection has a circulation bore machined therein through the outer end thereof;

and further comprising a respective communication bore interconnecting each nozzle mounting recess with the circulation bore, and machined at a second angle with respect to the centerline of the main body, greater than the first angle.

22. A method of making a main body portion for use in a roller cone type drill bit, comprising the steps of:

forging the main body portion as a monolith comprising a shank blank extending longitudinally at one end and a plurality of circumferentially spaced leg stubs at the other end, with a flash line running perpendicular to the longitudinal centerline of the forging and well inward of the free ends of the leg stubs, the radially outer surface of each leg stub being so forged to taper radially inwardly from the flash line to the outer end of the leg stub.

23. The method of claim 22 further comprising machining the outer side of each leg stub of the main body forging to remove said taper, so that the radial width of the finished main body member in the vicinity of the former flash line of the main body forging is less than or equal to its width at the outer ends of the leg stubs.

24. The method of claim 23 comprising so forging the main body forging to include a plurality of nozzle mounting portions interspersed between the leg stubs so that the radially outer side of each nozzle mounting portion is tapered radially inwardly from the flash line to an outer end thereof, but at no point extends radially beyond the outer ends of the leg stubs.

25. The method of claim 24 further comprising machining a respective nozzle mounting recess in each of the nozzle mounting portions at a first angle to the centerline, machining a circulation bore through the end of the shank; and machining a respective communication bore between each nozzle mounting recess and the circulation bore at a second angle to the centerline, greater than the first angle.

* * * * *